United States Patent [19]
Koepper et al.

[11] Patent Number: 5,903,571
[45] Date of Patent: May 11, 1999

[54] DISTRIBUTED TRANSIT PRIVATE BRANCH EXCHANGE

[75] Inventors: Richard Koepper, Tomkins Cove, N.Y.; Adoor V. Balasubramanian, Wayne, N.J.

[73] Assignee: Timeplex, Inc., Woodcliff Lake, N.J.

[21] Appl. No.: 08/726,579

[22] Filed: Oct. 7, 1996

[51] Int. Cl.⁶ .................................................. H04J 3/12
[52] U.S. Cl. ............................................ 370/524; 379/224
[58] Field of Search .................................... 370/357, 359, 370/388, 396, 524; 379/114, 115, 198, 207, 220, 229, 225, 240

[56] References Cited

U.S. PATENT DOCUMENTS

| | | | |
|---|---|---|---|
| 4,442,321 | 4/1984 | Stehman | 179/18 FB |
| 4,488,004 | 12/1984 | Bogart et al. | 179/18 AD |
| 4,811,334 | 3/1989 | Matt | 370/60 |
| 4,837,816 | 6/1989 | Mizuhara et al. | 379/221 |
| 5,212,691 | 5/1993 | Hokari | 370/110.1 |
| 5,282,244 | 1/1994 | Fuller et al. | 379/230 |
| 5,319,640 | 6/1994 | Yamasaki et al. | 370/68.1 |
| 5,333,187 | 7/1994 | Hiraiwa et al. | 379/219 |
| 5,339,356 | 8/1994 | Ishil | 379/234 |
| 5,367,566 | 11/1994 | Moe et al. | 379/243 |
| 5,404,398 | 4/1995 | Domoto et al. | 379/220 |
| 5,422,943 | 6/1995 | Cooney et al. | 379/225 |
| 5,446,732 | 8/1995 | Miyamoto | 370/58.2 |
| 5,450,482 | 9/1995 | Chen et al. | 379/207 |
| 5,481,673 | 1/1996 | Michelson | 395/200.15 |
| 5,572,579 | 11/1996 | Orriss et al. | 379/142 |
| 5,610,972 | 3/1997 | Emery et al. | 379/58 |
| 5,680,446 | 10/1997 | Fleischer, III et al. | 379/114 |

FOREIGN PATENT DOCUMENTS

| | | |
|---|---|---|
| 0667723 | 2/1985 | European Pat. Off. . |
| 0556515 | 12/1992 | European Pat. Off. . |
| WO9315583 | 8/1983 | WIPO . |

*Primary Examiner*—Hassan Kizou
*Assistant Examiner*—A. Bnimcussa
*Attorney, Agent, or Firm*—Irwin Ostroff; Erwin W. Pfeifle

[57] ABSTRACT

A plurality of M PBXs are coupled to a plurality of N nodes forming a Distributed Transit Private Branch Exchange (PBX). The plurality of N nodes are located remotely from each other and form a wide area network. Each node is coupled to predetermined ones of the other nodes via separate links so that each node is able to communicate with all other nodes. One or more D-channel Server Modules (DSMs) are located in predetermined nodes of the plurality of N nodes. Each DSM is associated with a plurality of D channels which are each coupled to a separate interface device in the same node or different node by means of a link for receiving and transmitting signaling data to one of an associated predetermined PBX of the plurality of PBXs. Each DSM is arranged to analyze the call signaling message received via a D channel and, based on routing information, either route the call back to the same PBX or a different PBX attached to the same DSM when the calling and called subscribers are located in the PBXs attached to the same DSM, or route the call to a remote DSM when the call is routed between remote PBXs that are not coupled to the same DSM. The remote DSM, in turn, routes the call to the PBX attached to that DSM. Therefore, each DSM only controls calls addressed to a DSM associated with that DSM, and when a call is not addressed to a PBX associated with that DSM, the DSM passes any call control to a destination DSM associated with a PBX to which the call is addressed.

17 Claims, 4 Drawing Sheets

DISTRIBUTED TRANSIT PRIVATE BRANCH EXCHANGE

CROSS REFERENCE TO RELATED APPLICATIONS

This invention is related to U.S. patent application Ser. No. 08/726,633 (TX15) entitled "Method Of Distributed Call Control In A Distributed Transit PBX System", which is being filed concurrently with this application and which has common inventorship and a common assignee.

FIELD OF THE INVENTION

The present invention relates to Distributed Transit Private Branch Exchange (PBX) and, more particularly, to a wide area network of PBXs and associated Nodes that are interconnected to create the concept of a Distributed Transit PBX.

BACKGROUND OF THE INVENTION

Figure 1:
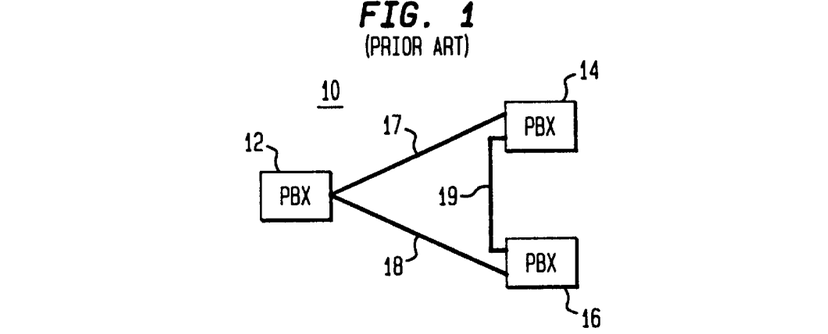
FIG. 1 is a block diagram of a network comprising a plurality of Private Branch Exchanges (PBXs) interconnected in accordance with a prior art arrangement.

Private Branch Exchanges (PBXs) are typically used by a corporation to provide voice/data (Voice/Facsimile/Modem/Data) between various facilities within the corporation. Referring now to FIG. 1, there is shown a prior art network 10 comprising a plurality of PBXs 12, 14, and 16 which are interconnected with communication lines 17, 18, and 19. More particularly, PBX 12 is interconnected to PBX 14 and PBX 16 via communication lines 17 and 18, respectively, while PBX 14 is interconnected to PBX 16 via the communication line 19. Therefore, each PBX 12, 14, and 16 can directly communicate with any of the other PBXs in the network 10. If two PBXs need to communicate, then a separate connection between the PBXs is required. This configuration becomes increasingly more inefficient as the number of PBXs increases because the number of leased communication lines required becomes excessive in order to keep connectivity between the PBXs.

Figure 2:
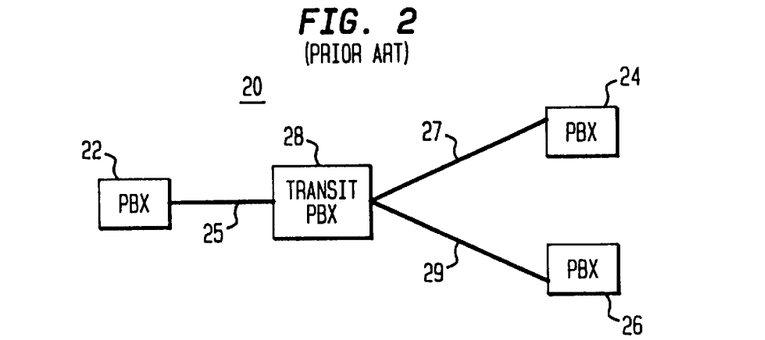
FIG. 2 is a block diagram of a network comprising a plurality of Private Branch Exchanges (PBXs) interconnected in accordance with a prior art arrangement that illustrates the concept of a Transit PBX.

Referring now to FIG. 2, there is shown a prior art network 20 which reduces the number of leased communication lines needed in a large network and illustrates the known concept of a "Transit PBX". The network 20 comprises a plurality of remote PBXs 22, 24, and 26, and a remote Transit PBX 28 that is interconnected to the remote PBXs 22, 24, and 26 via separate leased communication lines 25, 27, and 29, respectively. For example, the PBXs 22, 24, and 26 could be located in Los Angles, New York, and Dallas, respectively, with the Transit PBX 28 located in Chicago. All call control between the PBXs 22, 24, and 26 is performed within the single box of the Transit PBX 28.

Figure 3:
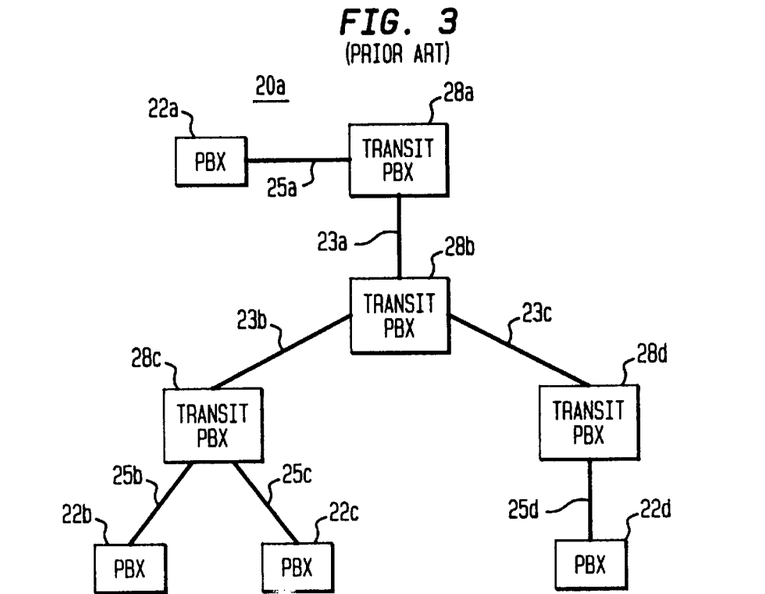
FIG. 3 is a block diagram of a network comprising a plurality of Transit Private Branch Exchanges (PBXs) and associated PBXs that are interconnected in accordance with a prior art arrangement.

Referring now to FIG. 3, there is shown a prior art network 20a which includes four Transit PBXs similar to the Transit PBX 28 of FIG. 2 that are interconnected. The network 20a comprises a plurality of Transit PBXs of which four Transit PBXs 28a, 28b, 28c, and 28d are shown. The Transit PBX 28a is interconnected to a remote PBX 22a via a leased communication lines 25a, and is interconnected to the Transit PBX 28b via a link 23a. The Transit PBX 28b is also interconnected to Transit PBXs 28c and 28d via separate leased communication lines 23b and 23c, respectively. The Transit PBX 28c is interconnected to PBXs 22b and 22c via separate leased communication lines 25b and 25c, respectively. The Transit PBX 28d is interconnected to PBX 22d via a leased communication lines 25d. All call control between the PBXs 22a, 22b, 22c, and 22d is performed within the single box of each of the Transit PBX 28a, 28c, or 28d interconnected to the associated PBXs. Still further, each of the Transit PBXs 28a, 28b, and 28c need to be manually updated to include any changed route information occurring in each of the other Transit PBXs.

U.S. Pat. No. 4,488,004 (Bogart et al.), issued on Dec. 11, 1984, discloses an arrangement for according station and attendant feature transparency between independently operational Private Branch Exchanges (PBXs) of a PBX network. Each PBX includes a switching processor, station lines, and tie trunks extending to other PBXs, and also includes a Direct Memory Data Controller (DMDC) for transmitting service or feature related data messages associated with tie-trunk calls to other PBXs over data links. On an interPBX call, the DMDC in the calling PBX transmits a data message to a DMDC in the called PBX over a direct link between the calling and called PBXs. In the event there is no direct link between the calling and called PBXs, the DMDC in the calling PBX transmits a message over a data link to a DMDC at a tandem PBX which, in turn, sends the message over a link to the DMDC in the called PBX. The DMDC in the called PBX processes the received data message and, by direct memory access, sends the message to its switch processor which provides the specified feature or other service required on the call above and beyond the establishment of a voice path connection between the calling and called PBXs. Such arrangement is similar to the network of FIG. 1.

U.S. Pat. No. 5,422,943 (Cooney et al.), issued on Jun. 6, 1995, discloses a Private Branch Exchange (PBX) network comprising at least two PBXs where each PBX serves a group of stations of a customer, and at least two Serving Switching Systems (SSSs) for serving the PBXs which are interconnected via a public switched telephone network. The PBXs are each connected to one of the SSSs via at least one Integrated Services Digital Network (ISDN) Primary Rate Interface (PRI) facility. The SSSs are interconnected for transmitting ISDN signals, and the ISDN stations on one of the PBX can communicate, using ISDN signals, with ISDN stations on another one of the PBXs via ones of the SSSs. Call control signals for interPBX calls of the customers of the PBX network are exchanged between a specific calling PBX and a SSS to which the specific PBX is connected. Ones of the SSSs comprise translation data for associating any internal customer directory number with any customer station.

U.S. Pat. No. 5,212,691 (Hokari), issued on May 18, 1993, discloses a private network where Private Branch Exchanges (PBXs) are connected directly through a dedicated tie trunk to allow direct interworking between the PBXs, and through a Primary Rate Interface (PRI) to an Integrated Services Digital Network (ISDN). One of the PBXs (a master PBX) has (a) routing data for virtual tie trunks for signaling and speech transmission to be established via the ISDN to a distant PBX, and (b) channel status data indicating their set-up or clear-down state according to time of day and calender day. The stored data is periodically accessed and, depending on the contents of the channel status data, a call set-up or clear-down message is sent from the master PBX to the ISDN to set-up or clear-down the virtual tie trunks. On receipt of a response from the distant PBX, busy/idle status of the virtual tie trunks is changed according to the accessed channel status data. In response to a request from a user station, a path is established therefrom to the virtual speech tie trunk and a call set-up message is sent directly to the distant PBX through the virtual signaling tie trunk.

The prior art references teach that the PBXs of a network act as separate PBXs or nodes that handle call control for that PBX or node. It is desirable to provide an arrangement wherein call control is distributed across a wide area network instead of solely within a single PBX or node.

SUMMARY OF THE INVENTION

The present invention is directed to a Distributed Transit Private Branch Exchange (PBX) and, more particularly, to a wide area network of Nodes that are interconnected to create the concept of a Distributed Transit PBX.

Viewed from one aspect, the present invention is directed to a Distributed Transit PBX comprising a plurality of M PBXs, a plurality of N nodes, and a plurality of X D-channel Server Modules (DSMs). The plurality of N nodes are located remote from each other and form a wide area network. Each node is coupled to predetermined ones of the other nodes via separate links so that each node is able to communicate with all other nodes. Each DSM comprises a plurality of D channels which are each coupled to a separate interface device in a same node or a different node by means of a link for receiving and transmitting signaling data to one of an associated predetermined PBX of the plurality of PBXs. Each DSM is arranged to analyze a call signaling message received via a D channel, and, based on routing information, route the call back to the same PBX or a different PBX coupled to the same DSM when the calling and called subscribers are located in the PBXs attached to the same DSM, and route the call to a remote DSM when the call is routed between two PBXs that are not coupled to the same DSM.

Viewed from another aspect, the present invention is directed to a Distributed Transit PBX comprising a plurality of M PBXs, a plurality of N nodes, and a plurality of X D-channel Server Modules (DSMs). The plurality of N nodes are located remotely from each other and forming a wide area network. Each node is coupled to predetermined ones of the other nodes via separate links so that each node is able to communicate with all other nodes. Each DSM is arranged to analyze a call signaling message received via a D channel, and, based on routing information, route the call back to the same PBX or a different PBX attached to the same DSM when the calling and called subscribers are located in the PBXs attached to the same DSM, and route the call to a remote DSM when the call is routed between two PBXs that are not coupled to the same DSM. Each DSM comprises a plurality of D channels, a memory, and a processor. Each of the plurality of D channels are selectively coupled to a link to another node and to a separate interface device for selectively receiving and transmitting signaling data to one of an associated predetermined PBX of the plurality of PBXs. The memory stores a local routing table for storing a listing of each exchange code (EC) handled by the DSM and associated with the associated predetermined PBX, and a remote routing table for storing a listing of the exchange codes handled by each of each of the other remote DSMs. The processor receives call connect signaling data on a D channel and determines a proper route to complete a call in the Distributed Transit Private Branch Exchange from the local routing table and the remote routing table.

The invention will be better understood from the following more detailed description taken with the accompanying drawings and claims.

DETAILED DESCRIPTION

Figure 4:
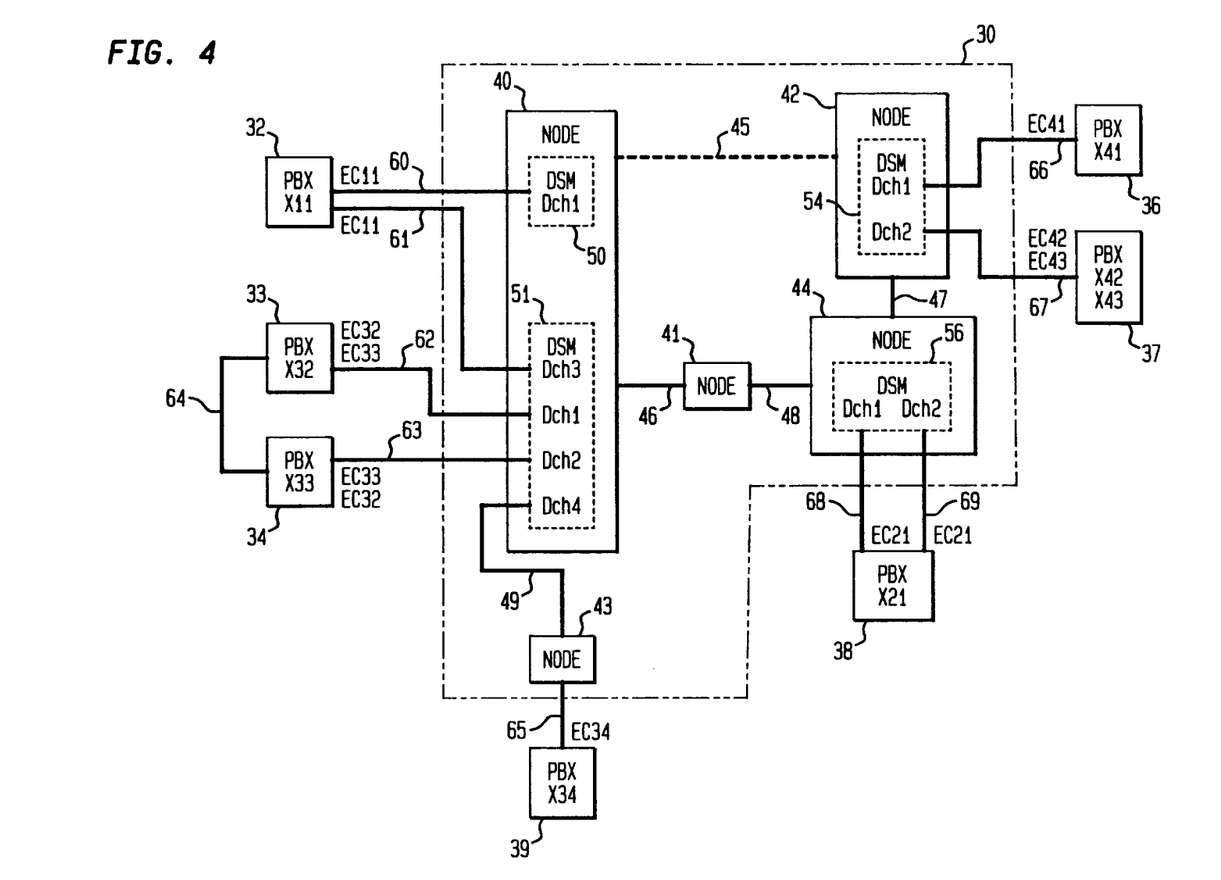
FIG. 4 is a block diagram of a network comprising a plurality of Private Branch Exchanges (PBXs) and local nodes interconnected to form a single Distributed Transit PBX in accordance with the present invention.

Referring now to FIG. 4, there is shown a block diagram of a Distributed Transit PBX 30 (shown within a dashed line block) in accordance with the present invention. The Distributed Transit PBX 30 comprises a plurality of N interconnected Nodes 40, 41, 42, 43, and 44 which permit a plurality of M Private Branch Exchanges (PBXS) 32, 33, 34, 36, 37, 38, and 39 that are connected to the Distributed Transit PBX 30 to communicate over a wide area network. There are illustrated seven PBXs as the M PBXs, where M can be less than, equal to, or greater than seven. Still further, there are illustrated five Nodes as the N Nodes, where N can be less than, equal to, or greater than five, and the M PBXs can be less than, equal to, or greater than the number of N Nodes.

The PBX 32 (PBX X11) is coupled to a D channel 1 (Dch1) of a D-Channel Server Module (DSM) 50 in the Node 40 via a link 60, and to a D channel 3 of a DSM 51 in the Node 40 via a link 61. The PBX 33 (PBX X32) and the PBX 34 (PBX X33) are coupled to a D channel 1 (Dch1) and a D channel 2 (Dch2), respectively, in the DSM 51 in the Node 40 via respective links 62 and 63. The PBX 39 (PBX X34) is coupled to a D channel 4 (Dch4) in the DSM 51 via a link 65, the Node 43, and a link 49. The PBX 36 (PBX X41) and the PBX 37 (PBX X42 X43) are coupled to a D channel 1 (Dch1) and a D channel 2 (Dch2), respectively, in a DSM 54 in the Node 42 via respective links 66 and 67. The PBX 38 (PBX X21) is coupled to a D channel 1 (Dch1) and a D channel 2 (Dch2) of a DSM 56 in the Node 44 via links 68 and 69, respectively. Each of the Nodes 40, 41, 42, 43, and 44 has X DSMs, where X≧0. The Nodes 40, 41, 42, 43, and 44 are remote to each other and are located local to the associated PBXs 32, 33, 34, 36, 37, 38, and 39. For example, the PBXs 32, 33, and 34 and the Node 40 can be located local to each other in Los Angeles, the PBXs 36 and 37 and the Node 42 can be located local to each other in New York City, the PBX 38 and the Node 44 can be located local to each other in Dallas, and the PBX 39 and the Node 43 can be located local to each other in San Diego but connected to Node 40 via the link 49. This permits local lines (e.g., lines 60, 62, and 63) to be used between the associated PBXs (e.g., PBXs 32, 33, and 34) and the Node (e.g., 40) which can be obtained from a local communication system. The Node 40 is shown coupled to the Node 42 via an interconnection 45 (shown as a dashed line) and to the Node 44 via an interconnection 46, the Node 41, and an interconnection 48, while the Nodes 42 and 44 are shown coupled together via an interconnection 47. It is to be understood that all of the interconnections 45, 46, 47, and 48 are not required as long as each of the Nodes 40, 42, and 44 can communicate with each of the other Nodes directly or via and intermediate Node. For example, interconnection 45 can be eliminated because the Node 40 can communicate with the Node 42 via the interconnection 46, the Node 41, the interconnection 48, the Node 44 and the interconnection 47. Still further, it is to be understood that the interconnections 45, 46, 47, 48, and 49 can be obtained via a private or a local and/or long distance public communication system (e.g., leased lines).

Each of the PBXs 32, 33, 34, 36, 37, 38, and 39 support predetermined signaling protocols such as, for example, the British Telecom's devised Digital Private Network Signaling System No. 1 (DPNSS) signaling protocol standard, or QSIG which is the European Telecommunications Standards Institute's devised signaling protocol standard. Each of the PBXs 32, 33, 34, 36, 37, 38, and 39 (via Node 43) are connected to the associated Nodes 40, 42, or 44 via a separate port (not shown) on, for example, an E1 or T1 module (not shown) in the associated Node 40, 42, or 44 using a Common Channel Signaling (CCS) signaling protocol. Such signaling protocols use an entire 64 kbit/sec time slot on an E1 or T1 facility connecting the PBX 32, 33, 34, 36, 37, 38, and 39 to the associated Node 40, 42, or 44, and the signaling time slot is referred to as a D channel message. It is to be understood that a predetermined kbit/sec time slot can be used other than the 64 kbit/sec time slot mentioned hereinabove when using other facilities. The remaining time slots are B channels and are available for user data. PBXs 32, 33, 34, 36, 37, 38, and 39 that use CCS operate with specific Layer 2 and Layer 3 signaling protocols on a CCS channel. Since the CCS PBXs (e.g., PBX 32) are connected to their associated local node (e.g., Node 40), if the Node could decode call state information in the CCS channel, then the Node could provide Voice Compression with Bandwidth Contention between the PBXs 32, 33, 34, 36, 37, 38, and 39. To solve this problem, the DSMs 50, 51, 54, and 56 are arranged to decode the Layer 2 and Layer 3 CCS protocol signaling messages and provide correct type of voice/data circuits for a call. Still further, because the CCS protocol is fully decoded in a DSM (e.g., DSM 50), the telephone numbers being called are known in the DSM such that a call can be switched to an appropriate destination as will be described hereinafter.

The Nodes 40, 42, and 44 each comprise at least one D-Channel Server Module (DSM) 50, 51, 54, or 56 which are used to provide distributed call control between nodes 40, 42, and 44 across the Distributed Transit PBX 30. The DSMs 50, 51, 54, and 56 use the D channel messages to establish calls, disconnect calls, and support supplementary services. More particularly, the DSMs 50, 51, 54, and 56 enable the network of Nodes 40, 41, 42, 43, and 44 to emulate a Transit PBX network as shown in FIG. 2 to terminate protocols, relay information across the network of Nodes 40, 41, 42, 43, and 44, and regenerate appropriate messages at a far side of the node network. Call set-up and disconnect messages are also interpreted by each of the DSMs 50, 51, 54, and 56 to connect/disconnect connections between the requested B channels at the PBXs 32, 33, 34, 36, 37, 38, and 39. Each of the DSMs 50, 51, 54, and 56 is capable of serving up to a maximum of, for example, sixteen PBXs. For example, DSM 51 in Node 40 is shown as serving three separate PBXs (33, 34, and 39) via separate D channels (Dch1, Dch2, Dch3, and Dch4) of the exemplary sixteen possible channels.

Figure 5:
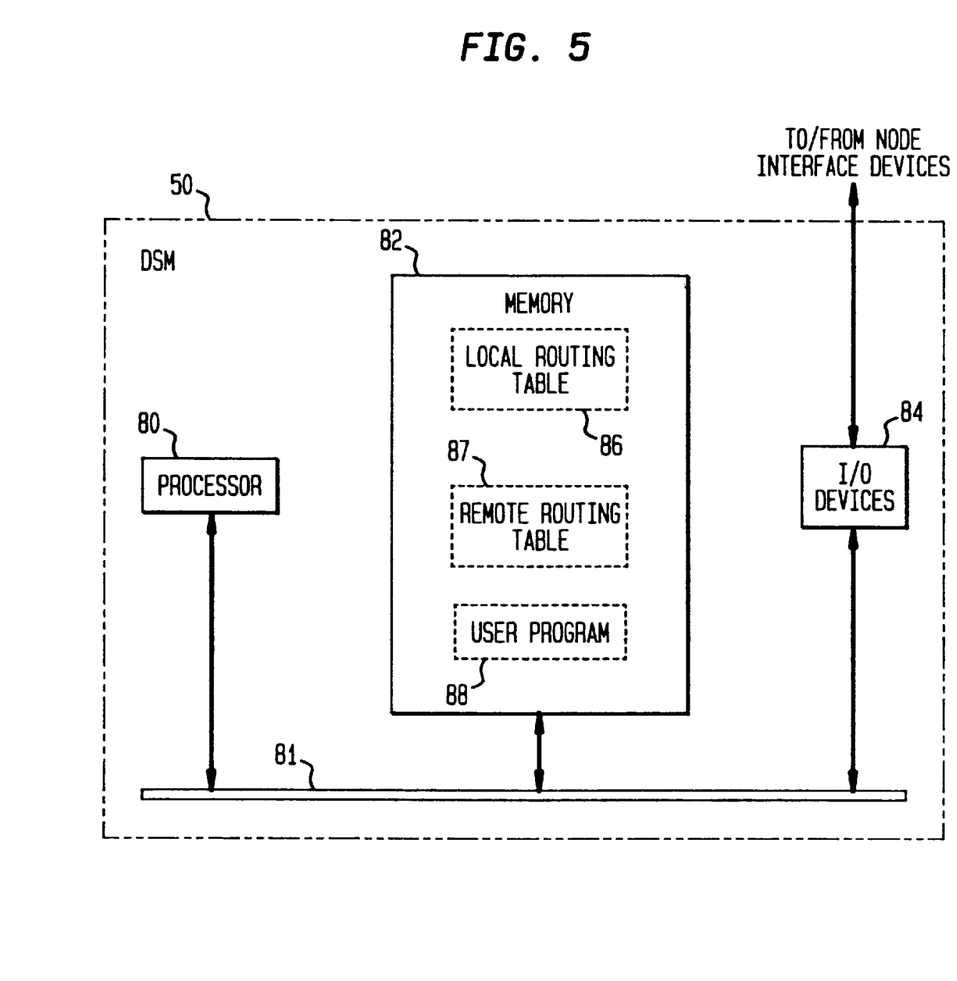
FIG. 5 is block diagram of a D-Channel Server Module forming part of each node of the Distributed Transit PBX of FIG. 4 in accordance with the present invention.

Referring now to FIG. 5, there is shown a block diagram of the D-Channel Server Module (DSM) 50 forming part of the Node 40 of the Distributed Transit PBX 30 of FIG. 4 in accordance with the present invention. It is to be understood that each of the other DSMs 51, 54, and 56 of the Nodes 40, 42, and 44, respectively, have a corresponding arrangements. The DSM 50 comprises a processor 80, a memory 82, and Input/Output Devices (I/O Devices) 84, with each coupled to a bus 81 for providing Distributed Call Control within the Distributed Transit PBX 30 of FIG. 4. The Memory 82 comprises separate memory sections associated with a Local Routing Table 86 (shown within a dashed line rectangle), a Remote Routing Table 87 (shown within a dashed line rectangle), and a User Program 88 (shown within a dashed line rectangle). The Processor 80 can comprise any suitable processor such as, for example, a microprocessor that executes the User Program 88 using the data stored in the Local Routing Table 86, the Remote Routing Table 87, and data provided by any Node Interface Device (not shown) and received by the I/O Devices 84 and transmitted via the bus 81 to the Processor 80. Information derived by the Processor 80 in the DSM 50 to enable Distributed Call Control within the associated Node 40 and the Distributed Transit PBX 30 is transmitted to the I/O Devices 84 for distribution by one or more of the selected Node Interface Devices.

Referring now to the combination of FIGS. 4 and 5, each of the Interface Devices (not shown) in the nodes 40, 42, and 44 for the PBXs 32, 33, 34, 36, 37, 38, and 39 is associated with one or more user-configured Exchange Codes (ECs). Also shown is the range of station numbers associated with each PBX as, for example, the nomenclature X13 for PBX 32 represents stations that are addressed with a calling number that starts with 13. For example, each Interface Device (not shown) in Node 40 for the PBX 32 is associated with EC11, each Interface Device (not shown) in Node 40 for the PBX 33 is associated with EC32 and EC33, each Interface Device (not shown) in the Node 40 for the PBX 34 is associated with EC33 and EC32, each Interface Device (not shown) in the Node 40 for the PBX 39 is associated with EC34, each Interface Device (not shown) in the Node 42 for the PBX 36 is associated with EC41, each Interface Device (not shown) in the Node 42 for the PBX 37 is associated with EC42 and EC43, and each Interface Device (not shown) in the Node 44 for the PBX 38 is associated with EC21. More particularly, the PBX 33 is primarily associated with EC32, but is capable of handling EC33 calls associated with PBX 34 in the event that the Dch2 of the DSM 51 or the link 63 become temporarily or permanently disabled. In this manner the PBX 34 is able to complete calls via link 64, the PBX 33, the link 62, and the Dch1 in the DSM 51. Similarly, the PBX 34 is primarily associated with EC33, but is capable of handling EC32 calls associated with PBX 33 in the event that the Dch1 of the DSM 51 or the link 62 become temporarily or permanently disabled. In this manner the PBX 33 is able to complete calls via the link 64, the PBX 34, the link 63, and the Dch2 in the DSM 51. PBX 37 is shown associated with EC42 and EC43 for the exemplary purpose of indicating that the PBX 37 can handle calls of customers with different Exchange Codes. PBX 38 is associated with EC21 but is shown using two D Channels (Dch1 and Dch2) in the DSM 56 of Node 44 to illustrate a condition where a PBX handles voluminous traffic and needs more than one D channel. The PBX 32 is associated with EC11, but is being shown using two D channels which are Dch1 of DSM 50 and Dch3 of DSM 51 in Node 40.

In operation, as the PBX Interface Devices are assigned to a DSM (e.g. DSM 50), the Local Routing Table 86 (shown only in FIG. 5) is generated in the associated DSM which lists the Exchange Codes that are handled by that DSM. In addition, the association between the Exchange Codes (e.g., EC11) and the DSM (e.g., DSM 50) in the Node 40 is broadcast to all of the other DSMs (e.g., DSMs 51, 54, and 56) that are interconnected to that DSM. The collection of the remote DSMs and their supported Exchange Codes is stored in the Remote Routing Table 87 in the Memory 82 of each of the DSMs 50, 51, 54, and 56. When a DSM (e.g., DSM 50) receives a call (or connect) request from the associated PBX (e.g., PBX 32), it compares the leading digits of the called number to entries in the Local Routing Table 86 of the DSM. If a match is found, the DSM (e.g., DSM 50) terminates the call on an appropriate Interface Device of that DSM since this is a local call for that PBX. If a match is not found, the DSM (e.g., DSM 50) examines the Remote Routing Table 87 in the DSM. If a match is found, then the call request is forwarded to the DSM (the called remote DSM) corresponding to the matching entry in the Remote Routing Table 87. The remote DSM (e.g., DSM 54) looks at its own Local Routing Table 86 to find a match destination interface (e.g., towards PBX 36) with a free B channel, and makes a B channel connection between PBX 32 and PBX 36. A compression step of the voice call can be performed after a free B channel on the called PBX interface is selected and when the B channel connection is performed. Therefore, each DSM only controls calls addressed to that DSM, and when a call is not addressed to a PBX associated with that DSM, the DSM passes any call control to a destination DSM associated with a PBX to which the call is addressed. An optional configuration would be to have the Node (e.g., Node 40) compress the B channel data if it is a voice call.

The advantages obtained with the Distributed Transit PBX 30 using a network of DSMs 50, 51, 54, and 56 over that of prior art networks 10, 20, and 20a shown in FIGS. 1, 2 and 3, respectively, are as follows. First, voice compression can be used in voice communications between two PBXs, and there is no tandeming of voice compression (which would be the case if it were a collection of PBXs instead of a single distributed PBX). More particularly, in the prior art network 20a shown in FIG. 3, if a voice call is made between, for example, PBX 22a and PBX 22d and a voice path needs to be compressed along the path between PBXs 22a and 22d to save bandwidth, the voice has to be decompressed and compressed again at each of the Transit PBXs 28a, 28b, and 28d along the route. With multiple compressions and decompressions, the voice quality deteriorates. However, in accordance with the present invention, if the plurality of Transit PBXs 28a, 28b, 28c, and 28d of FIG. 3 are replaced by the single Distributed Transit PBX 30 of FIG. 4, then compression and decompression is performed only once thereby saving the bandwidth and at the same time not compromising too much of the voice quality since a compressed path can be established directly between the B channels of the calling and called PBX interfaces. The compression step is performed after a free B channel on the called PBX interface is selected and when the B channel connection is performed.

Second, call switching is possible between PBXs 32, 33, 34, 36, 37, 38, and 39 and the Remote Routing Table 87 in each DSM 50, 51, 54, and 56 provides the ability to use alternate routes between DSMs. Third, more efficient message-based signaling protocol channels between the DSMs can run at a reduced bandwidth. This advantage results from packet channels being used between DSMs instead of full 64 kilobyte/second Time Division Multiplexed (TDM) channels which would be consumed whether or not signaling is transmitted. In other words, a packet is only transmitted between DSMs when signaling data is to be sent rather than using dedicated TDM channels which will be wasted even when no signaling data is to be sent. The full 64 kilobyte/second TDM channels can be used between a PBX (e.g., PBX 32) and its associated DSM (e.g., DSM 50) for signaling purposes since such signaling is transmitted over local lines. Fourth, there is a reduction in the number of leased lines required. More particularly, the Nodes 40, 41, 42, and 44 are located local to the associated PBXs 32, 33, 34, 36, 37, 38, and 39 and do not require leased lines. The only leased lines required would be the lines 45, 46, 47, and/or 48 between the Nodes 40, 41, 42, and 44 so that all DSMs 50, 51, 54, and 56 are able to communicate with all other DSMs directly or through other DSMs in the network. For example, DSMs 50 and 51 can communicate with DSM 54 via a leased line 46, the Node 41, a leased line 48, the DSM 56, and a leased line 47, when the leased line 45 is eliminated. Fifth, the routing table broadcast mechanism results in an automatic updating of routing information in all DSMs once the information is updated in any one of the DSMs. If there were a collection of Transit PBXs 20a as shown in FIG. 3 instead of a single Distributed Transit PBX 30, the updating of route information in one Transit PBX 28a is not automatically available to the other Transit PBXs 28b, 28c, and 28d. Each of the Transit PBXs 28a, 28b, 28c, and 28d has to be manually updated.

Figure 6:
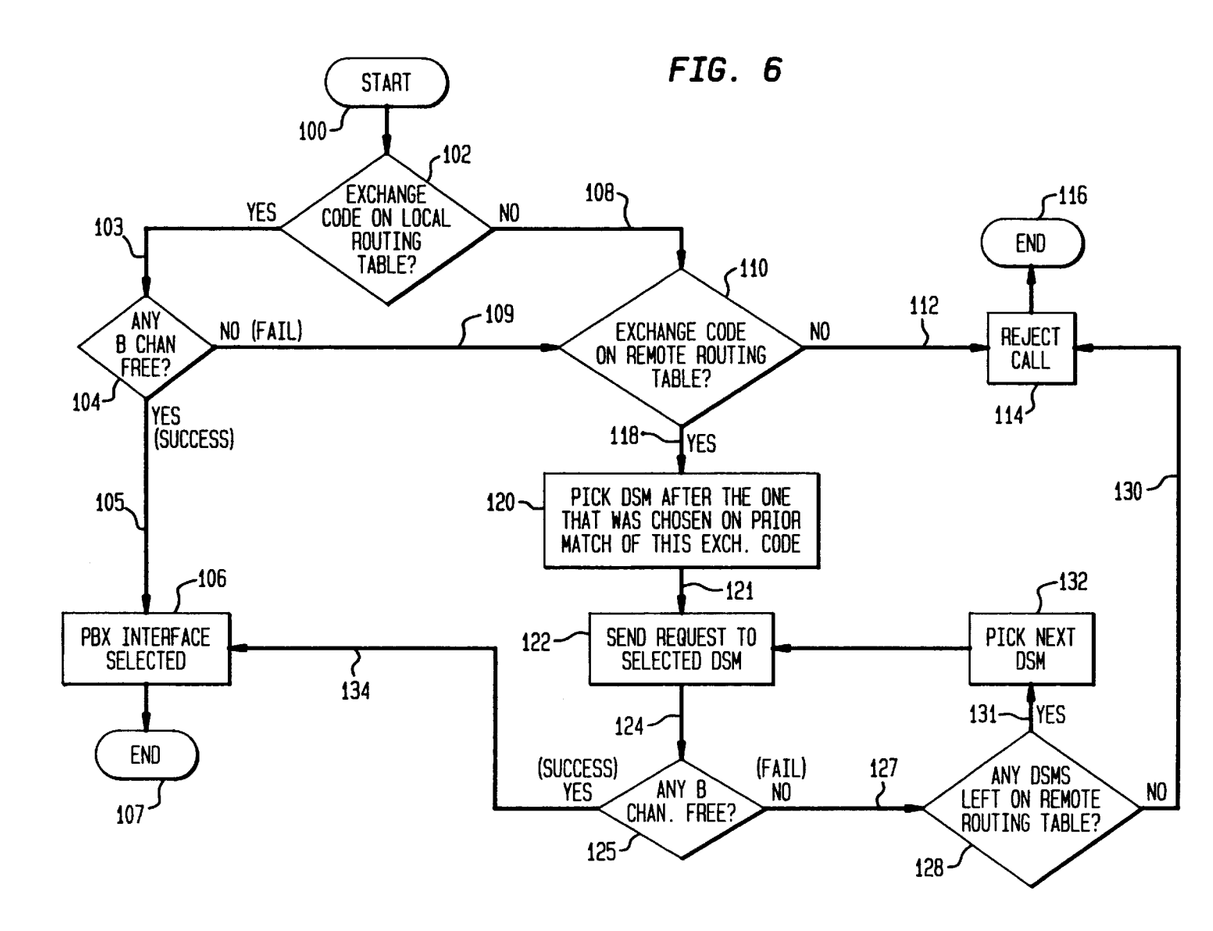
FIG. 6 is a flow diagram of distributed call control in the D-Channel Server Module of the Distributed Transit PBX of FIG. 4 in accordance with the present invention.

Referring now to FIG. 6, there is shown a flow diagram of distributed call control in the Distributed Transit PBX 30 of FIG. 4 in accordance with the present invention. For purposes of explanation, it will be assumed hereinafter that the flow diagram describes call handling of a call request from a subscriber of the PBX 32 by the DSM 50 in the Node 40 of FIGS. 4 and 5. It is to be understood that each of the other DSMs 51, 54, and 56 function in a similar manner when receiving call requests from their associated PBXs. The flow diagram corresponds to steps taken by the Processor 80 in using the User Program in the Memory section 88 of the Memory 82 (shown only in FIG. 5).

When a call request is received at the DSM 50 from the PBX 32, it is received by an Interface Device (not shown) of the Dch1 of the DSM 50 (shown in FIG. 4), and routed via the I/O devices 84 (shown only in FIG. 5) to the Processor 80. This is the starting point of the distributed call control process in the DSM 50 for a call request and corresponds to block 100 in FIG. 6. The program moves to block 102 where the Processor 80 interrogates the Local Routing Table 86 (shown only in FIG. 5) in the DSM 50 to determine if the Exchange Code forming part of the call request is listed on the Local Routing Table 86. If the Exchange Code (e.g., EC11) is found on the Local Routing Table 86, it indicates that the call is destined for another subscriber of the PBX 32. As a result, a "YES" path 103 from block 102 is taken to block 104 where a determination is made if any B channel is free to PBX 32. If a B channel to PBX 32 is found free, the "YES" path 105 directs the User Program 88 to block 106 to select an Interface Device for the PBX 32. Once the PBX Interface is selected, the calling and called subscribers are connected and the call processing sequence ends in an "END" block 107.

If the Exchange Code in the call request received in block 102 is not found when interrogating the Local Routing Table 86, the Processor 80 is directed via a "NO" path 108 to block 110 to interrogate the Remote Routing Table 87 (shown only in FIG. 5) and determine if the Exchange Code in the call request is listed in the Remote Routing Table 86. Similarly, if no free B channel is found as being available in block 104, the Processor 80 is also directed to block 110 via a "NO (FAIL)" path 109 to determine if the received Exchange Code is also found on the Remote Routing Table 87. An Exchange Code can be found on both the Local Routing Table 86 and the Remote Routing Table 87 under the condition where a PBX is connected to more than one DSM in the same or different Nodes. For example, The EC11 associated with PBX 32 will be matched in both the Local and Remote Routing Tables 86 and 87 of the DSM 40 in Node 50.

If the Exchange Code is not found on the Remote Routing Table 87, then the Processor 80 proceeds via a "NO" path 112 to block 114 and the call is determined as a rejected (REJECT) Call. Such determination causes a message to be sent to the calling PBX indicating such Non-Completed or rejected call. The Processor 80 then concludes the call request in an "END" block 116.

If the Exchange Code of the call request is found in the Remote Routing Table 87, the call proceeds from block 110 via a "YES" path 118 to block 120. In block 120 a destination DSM that will complete the call is chosen from the listing of DSMs on the Remote Routing Table 87 for the Exchange Code being processed. If more than one DSM is available for connection to a destination PBX, then the DSM after the one that was chosen in a prior match of the same Exchange Code is chosen to complete the call. Such sequential selection process provides a more uniform utilization of the hardware of the Nodes 40, 42, and 44 in the Distributed Transit PBX 30 of FIG. 4.

Once a destination DSM has been chosen in the block 120, the Processor 80 is directed via path 121 to block 122 to send a call request via a packet channel to the destination or next DSM selected in block 120. The Processor 80 then proceeds via path 124 to block 125 to determine if a free B channel is available to the chosen destination DSM. This is done by checking the response to the call request sent to the destination DSM.

If it is determined in block 125 that a free B channel is not available in the destination DSM, the Processor 80 proceeds via a "NO (FAIL)" path 127 to block 128 to determine if any other DSMs (e.g., intermediate DSMs) remain on the Remote Routing Table 87 to the destination DSM for the Exchange Code being processed. If no other DSMs are listed as remaining on the Remote Routing Table 87, the Processor 80 proceeds via a "NO" path 130 to block 114 where a Rejected call is declared and the call request is rejected with a proper message to the calling PBX in the END block 116.

If another DSM is found on the Remote Routing Table 87 in block 128, the Processor 80 proceeds via a "YES" path 131 to block 132 to choose the next DSM listed on the Remote Routing Table 87 to be used before returning to block 122. In block 122, the Processor 80 then sends a call request to the next chosen DSM via a packet channel and proceeds via path 124 to block 125 to determine if a B channel is free to the next chosen DSM. If a B channel to the destination or next chosen DSM is found free, the Processor 80 proceeds via a "YES (SUCCESS)" path 134 to block 106 indicating an Interface Device (not shown) in the next chosen DSM is selected. This ends the call request in the DSM 50 via block 107.

Once a Remote DSM handling the route is identified in block 120, a Call Setup Request is forwarded to the remote destination DSM via an inter-DSM communication channel on paths 45, 46 or 47 (shown only in FIG. 4). The Remote DSM then finds a PBX interface having a free B channel to set up the call, makes a Time Division Multiplex (TDM) connection between a source and destination B channels through the network of Nodes 40, 41, 42, and 44, and then forwards the call request to the destination PBX.

It is to be appreciated and understood that the specific embodiments of the invention described hereinabove are merely illustrative of the general principles of the invention. Various modifications may be made by those skilled in the art which are consistent with the principles set forth.

What is claimed is:

1. A Distributed Transit Private Branch Exchange (PBX) serving a plurality of remotely located M PBXs comprising:

a plurality of N nodes located remotely from each other and forming a wide area network, each node being coupled to predetermined ones of the other nodes via separate links so that each node is able to communicate with all other nodes; and a plurality of X D-channel Server Modules (DSMs) located in the N nodes, where predetermined ones of the N nodes comprise at least one DSM, each DSM comprising a plurality of D channels which are each coupled to a separate interface device in the same node or a different node by means of a link for receiving and transmitting signaling data to one of an associated predetermined PBX of the plurality of PBXs, and each DSM is arranged to analyze a call signaling message received via a D channel, and, based on routing information, route the call back to the same PBX or a different PBX coupled to the same DSM when the calling and called subscribers are located in the PBXs attached to the same DSM, and route the call to a remote DSM when the call is routed between two PBXs that are not coupled to the same DSM.

2. The Distributed Transit Private Branch Exchange of claim 1 wherein each DSM comprises:

a memory for storing a local routing table for storing a listing of each exchange code (EC) handled by the DSM and associated with the associated predetermined PBX, and a remote routing table for storing a listing of the exchange codes handled by each of each of the other remote DSMs; and a processor for receiving call signaling data on a D channel and determining a proper route to complete a call in the Distributed Transit Private Branch Exchange from the local routing table and the remote routing table.

3. The Distributed Transit Private Branch Exchange of claim 2 wherein when routing information in stored in the local routing table and remote routing table or updated thereafter, the routing information is automatically transmitted to each of the other DSM for storage in the memory of the other DSMs.

4. The Distributed Transit Private Branch Exchange of claim 2 wherein the processor determines if a free B channel is available to connect the call (a) to the associated predetermined PBX for a local call before a connection is completed if an exchange code is found on the local routing table, and (b) to a remote DSM when a received exchange code is found on the remote routing table and indicates that the call is to be routed via the remote DSM to a destination PBX.

5. The Distributed Transit Private Branch Exchange of claim 4 wherein compression of a voice call between DSMs is selectively performed after a free B channel is selected and when a B channel connection is performed.

6. The Distributed Transit Private Branch Exchange of claim 1 wherein signaling communication between nodes is performed using packet channels.

7. The Distributed Transit Private Branch Exchange of claim 6 wherein communication between a DSM and the associated predetermined PBX is performed using predetermined kilobyte Time Division Multiplexing (TDM) signaling channels over local links.

8. The Distributed Transit Private Branch Exchange of claim 1 wherein each DSM is arranged to decode a layer 2 and layer 3 Common Channel Signaling (CCS) protocol signaling message to provide a correct type of circuit for a call.

9. The Distributed Transit Private Branch Exchange of claim 1 wherein each DSM only controls calls addressed to a PBX associated with that DSM, and when a call is not addressed to a PBX associated with that DSM, the DSM passes any call control to a destination DSM associated with a PBX to which the call is addressed.

10. A Distributed Transit Private Branch Exchange (PBX) serving a plurality of remotely located M PBXs comprising:

a plurality of N nodes located remotely from each other and forming a wide area network, each node being coupled to predetermined ones of the other nodes via separate links so that each node is able to communicate with all other nodes; and a plurality of X D-channel Server Modules (DSMs) located in the N nodes, where predetermined ones of the N nodes comprise at least one DSM and where each DSM is arranged to analyze a call signaling message received via a D channel, and, based on routing information, route the call back to the same PBX or a different PBX attached to the same DSM when the calling and called subscribers are located in the PBXs attached to the same DSM, and route the call to a remote DSM when the call is routed between two PBXs that are not coupled to the same DSM, and comprises:

a plurality of D channels which are each coupled to a separate interface device in the same or different node for receiving and transmitting signaling data to one of an associated predetermined PBX of the plurality of PBXs;

a memory for storing a local routing table for storing a listing of each exchange code (EC) handled by the DSM and associated with the associated predetermined PBX, and a remote routing table for storing a listing of the exchange codes handled by each of each of the other remote DSMs; and a processor for receiving call connect signaling data on a D channel and determining a proper route to complete a call in the Distributed Transit Private Branch Exchange from the local routing table and the remote routing table.

11. The Distributed Transit Private Branch Exchange of claim 10 wherein the processor determines if a free B channel is available to connect the call (a) to the associated predetermined PBX for a local call before a connection is completed if an exchange code is found on the local routing table, and (b) to a remote DSM when a received exchange code is found on the remote routing table and indicates that the call is to be routed via the remote DSM to a destination PBX.

12. The Distributed Transit Private Branch Exchange of claim 11 wherein compression of a voice call between associated PBXs is selectively performed when a B channel connection is performed between the B channels on the calling and called PBX interfaces.

13. The Distributed Transit Private Branch Exchange of claim 10 wherein when routing information is stored in the local routing table and updated thereafter, the routing information is automatically transmitted to each of the other DSM for storage in the memory of the other DSMs.

14. The Distributed Transit Private Branch Exchange of claim 10 wherein signaling communication between nodes is performed using packet channels.

15. The Distributed Transit Private Branch Exchange of claim 14 wherein communication between a DSM and the associated predetermined PBX is performed using predetermined kilobyte Time Division Multiplexing (TDM) signaling channels over local links.

16. The Distributed Transit Private Branch Exchange of claim 10 wherein each DSM is arranged to decode a layer 2 and layer 3 Common Channel Signaling (CCS) protocol signaling message to provide a correct type of circuit for a call.

17. The Distributed Transit Private Branch Exchange of claim 10 wherein each DSM only controls calls addressed to a PBX associated with that DSM, and when a call is not addressed to a PBX associated with that DSM, the DSM passes any call control to a destination DSM associated with a PBX to which the call is addressed.

* * * * *